United States Patent
Caminita (10) Patent No.: US 10,648,592 B2
(45) Date of Patent: May 12, 2020

(54) AIR DUCT SUPPORT

(71) Applicant: Anthony F. Caminita, Gretna, LA (US)

(72) Inventor: Anthony F. Caminita, Gretna, LA (US)

(*) Notice: Subject to any disclaimer, the term of this patent is extended or adjusted under 35 U.S.C. 154(b) by 0 days.

(21) Appl. No.: 16/151,764

(22) Filed: Oct. 4, 2018

(65) Prior Publication Data

US 2020/0109798 A1    Apr. 9, 2020

(51) Int. Cl.
| | | |
|---|---|---|
| *F16L 3/12* | (2006.01) | |
| *F16L 1/024* | (2006.01) | |
| *F16L 3/02* | (2006.01) | |
| *F24F 13/02* | (2006.01) | |
| *F16L 3/127* | (2006.01) | |
| *F16L 3/14* | (2006.01) | |
| *F16L 3/133* | (2006.01) | |

(52) U.S. Cl.
CPC ........... *F16L 3/1218* (2013.01); *F16L 1/0246* (2013.01); *F16L 3/02* (2013.01); *F24F 13/0254* (2013.01); *F16L 1/0243* (2013.01); *F16L 3/127* (2013.01); *F16L 3/133* (2013.01); *F16L 3/14* (2013.01)

(58) Field of Classification Search
CPC ......... F24F 13/0254; F24F 13/32; F16L 3/02; F16L 3/133; F16L 3/127; F16L 1/0246; F16L 3/1218; F16L 1/0243; F16L 3/1025; F16L 3/12
USPC ........................................ 248/9, 62, 74.1, 58
See application file for complete search history.

(56) References Cited

U.S. PATENT DOCUMENTS

| | | | | |
|---|---|---|---|---|
| 3,363,865 A | * | 1/1968 | Metsker ................. | E04D 13/08 248/71 |
| 3,517,901 A | * | 6/1970 | Jenkins .................. | F16L 3/133 248/327 |
| 3,559,910 A | * | 2/1971 | Babb ...................... | F16L 3/133 248/59 |
| 3,565,375 A | * | 2/1971 | Babb ...................... | F16L 3/133 248/59 |
| 4,004,768 A | * | 1/1977 | Evans ................. | F01N 13/1822 248/59 |
| 5,603,187 A | * | 2/1997 | Merrin ................... | E04D 13/12 52/58 |
| 5,762,300 A | * | 6/1998 | Sorkin ..................... | E04C 5/10 248/72 |
| 5,820,092 A | * | 10/1998 | Thaler ..................... | F16M 5/00 248/237 |
| 5,871,306 A | * | 2/1999 | Tilcox ..................... | F16L 3/13 405/157 |
| 5,890,683 A | * | 4/1999 | DePietro ................ | F16L 3/133 248/58 |
| 5,957,416 A | * | 9/1999 | Sellati .................... | H02G 3/26 248/58 |

(Continued)

*Primary Examiner* — Hiwot E Tefera
*Assistant Examiner* — Taylor L Morris (57) ABSTRACT

An air duct support for supporting flexible air ducts and similar pipes without constricting airflow through the pipes. The support has an arcuate main body portion for receiving a portion of the conduit therein and an upright support attached to a bottom of the top portion and supporting the conduit at an elevated position in relation to a base surface, where said arcuate main body portion includes strengthening beads that run the length of said main body. The top portion rotates 360 degrees in relation to the support member to accommodate any direction of extension of the conduit.

1 Claim, 9 Drawing Sheets

(56) References Cited

U.S. PATENT DOCUMENTS

| | | | | |
|---|---|---|---|---|
| 6,257,530 B1* | 7/2001 | Tsai | F16L 3/127 | 248/73 |
| 6,595,471 B1* | 7/2003 | Botting | F16L 3/02 | 248/339 |
| 6,629,676 B1* | 10/2003 | Gretz | H02G 3/30 | 248/58 |
| 6,672,029 B2* | 1/2004 | Tucker | B28B 23/0056 | 248/73 |
| 7,083,151 B2* | 8/2006 | Rapp | F16L 3/133 | 24/16 PB |
| 7,150,438 B2* | 12/2006 | Schaty | F16L 3/1008 | 248/74.1 |
| 7,407,138 B1* | 8/2008 | Gretz | F16L 3/02 | 248/304 |
| 7,540,452 B2 | 6/2009 | Caminita | | |
| 8,757,560 B2* | 6/2014 | Darnell | H02G 3/0456 | 174/68.1 |
| 8,763,960 B1* | 7/2014 | Moore | F16L 3/133 | 248/65 |
| 9,046,197 B2* | 6/2015 | Cousineau | F16L 3/11 | |
| 9,982,802 B1* | 5/2018 | Patterson | F24F 13/32 | |
| 2003/0102412 A1* | 6/2003 | Miescher | F16L 3/133 | 248/62 |
| 2005/0056736 A1* | 3/2005 | Thompson | F16L 3/133 | 248/58 |
| 2005/0211851 A1* | 9/2005 | Caminita, Jr. | F16L 1/0246 | 248/65 |
| 2005/0258315 A1* | 11/2005 | Bigham | F16L 3/133 | 248/74.3 |
| 2008/0111033 A1* | 5/2008 | Eldridge | H02G 3/24 | 248/74.1 |
| 2008/0203241 A1* | 8/2008 | Boudreau | F16L 3/02 | 248/58 |
| 2008/0217056 A1* | 9/2008 | Howard | H02G 9/065 | 174/88 S |
| 2010/0038494 A1* | 2/2010 | Osborn | F16L 3/1218 | 248/58 |
| 2010/0294895 A1* | 11/2010 | Heath | F16L 3/1207 | 248/60 |
| 2012/0132761 A1* | 5/2012 | Elsmore | F16L 3/1075 | 248/74.1 |
| 2013/0075540 A1* | 3/2013 | Hammond | F16L 3/1008 | 248/62 |
| 2013/0118627 A1* | 5/2013 | Utay | F16L 3/1016 | 138/106 |
| 2014/0061395 A1* | 3/2014 | Allivato, Sr. | F16L 3/1058 | 248/67.7 |
| 2014/0284433 A1* | 9/2014 | Gazlay | F16L 3/1246 | 248/87 |
| 2014/0312182 A1* | 10/2014 | Nijdam | F16L 3/26 | 248/49 |
| 2014/0346288 A1* | 11/2014 | Carson | F16L 3/006 | 248/58 |
| 2015/0090846 A1* | 4/2015 | Crowley | F24F 13/32 | 248/188.5 |
| 2016/0138734 A1* | 5/2016 | Keller | F16B 9/026 | 248/49 |
| 2016/0273679 A1* | 9/2016 | Rebholz | F16L 3/133 | |
| 2016/0327187 A1* | 11/2016 | Brown | F16L 3/13 | |
| 2019/0285310 A1* | 9/2019 | Pinkalla | F24F 13/0218 | |

\* cited by examiner

AIR DUCT SUPPORT

BACKGROUND OF THE INVENTION

I. Field of the Invention

The present invention relates to improved conduit supports and, more particularly, to a support or holder for supporting hollow conduits, such as air, heating ducts or pipes between adjacent joists of a building structure.

II. General Background

Conventionally, heating, cooling, ventilating and air conditioning systems (HVAC systems) in buildings use pipes, tubes, flexible ducts and other tubular bodies for conveying the air within the building. The tubular conduits are supported between floor or ceiling joists and normally secured in a suspended position by nylon straps or metal hangers that are placed between the joists. One problem with conventional duct supports is that the nylon straps or metal brackets have to be secured to a rafter, which in some cases is located at a relatively high level above a base surface, or floor of an attic. To reach the rafter, the worker has to climb a ladder or construct a special platform high enough to give access to the rafter. Naturally, such method of suspending the tubular conduits takes time and increases the cost of the labor involved in the construction of the building.

Another problem with the use of flexible straps is that they tend to constrict the airflow within a flexible duct. When the strap is tied to the rafter, it is estimated that about 25% of airflow may be lost due to the duct constriction. Still another problem associated with suspending the air ducts is that a condensate tends to form in the portion of the air duct that sags between adjacent straps. The accumulated moisture drips into the insulation, where it can cause damage or facilitate development of mold and mildew around the duct.

The present invention contemplates elimination of drawbacks associated with conventional methods and provision of a duct support that can support the ducts or other tubular conduits from above or below the conduit without constricting the flow of gas or fluid through the conduit. Specifically, the present invention is an improvement over the invention disclosed in U.S. Pat. No. 7,540,452, the disclosure of which is incorporated herein by this reference.

SUMMARY OF THE INVENTION

In accordance with one embodiment, the present invention is a conduit support device, comprising a main body having opposing ends and a bottom defining an opening channel to form a U-shaped configuration, said channel being sized and shaped for receiving a portion of the conduit therein, said main body being provided with a strengthening bead extending along a curvature of the main body; and, an upright support member having a top portion for supporting the main body and a lower portion, being configured for securing to a structural member, and wherein said main body is freely rotatable in relation to the top portion of the support member about a horizontal axis.

In another embodiment, the present invention is a conduit support device, comprising a main body having opposing ends and a bottom defining an opening channel to form a U-shaped configuration, said channel being sized and shaped for receiving a portion of the conduit therein, said main body being provided with a strengthening bead extending along a curvature of the main body and also with a plurality of spaced openings located centrally and spaced equidistantly along the curvature of the main body; an upright support member having a top portion for supporting the main body and a lower portion, being configured for securing to a structural member, and wherein said main body is freely rotatable in relation to the top portion of the support member about a horizontal axis; and a retaining member for positioning about portion of the conduit outside of the channel, said retaining member being detachably securable to said main body, said retaining member comprising a flexible generally planar strap having two opposing ends with folded ends, at least two hook members positioned in said folded ends by an attachment part, said each hook member having a hook portion that engages the spaced opening in the main body to secure the opposing ends of the training member to said main body.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

Figure 16:
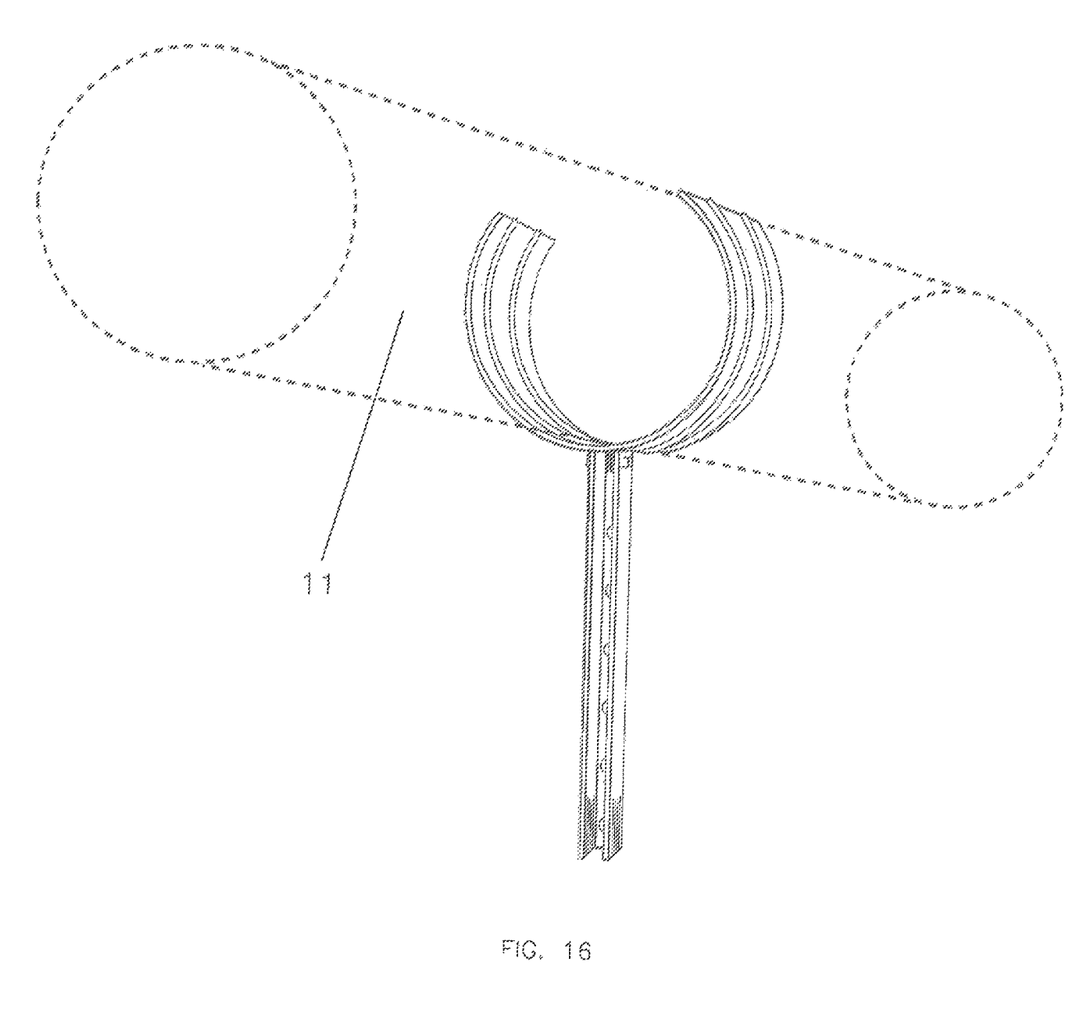
FIG. 16 is a perspective view illustrating position of a conduit within a first embodiment of the present invention.

Turning now to the drawings in more detail, numeral 10 (FIG. 1) designates the air duct support unit in accordance with the first embodiment of the present invention. The air duct support 10 comprises a main body member 12 and an upright support member 14. The main body 12 has a generally arcuate body defining a generally C-shaped channel 16 for receiving a tubular conduit, such as an air duct 11 there through. The main body 12 has a bottom surface 18 and opposing ends 15 and 17. The main body 12 has a generally C-shaped cross-section so as to accommodate an air duct and extend somewhat along the sides of the conduit, as can be seen in FIG. 16. A rivet 13 secures the main body 12 to the upright support member 14, allowing the main body 12 to freely rotate in relation to the upright support 14 around the longitudinal axis of upright support 14.

Figure 1:
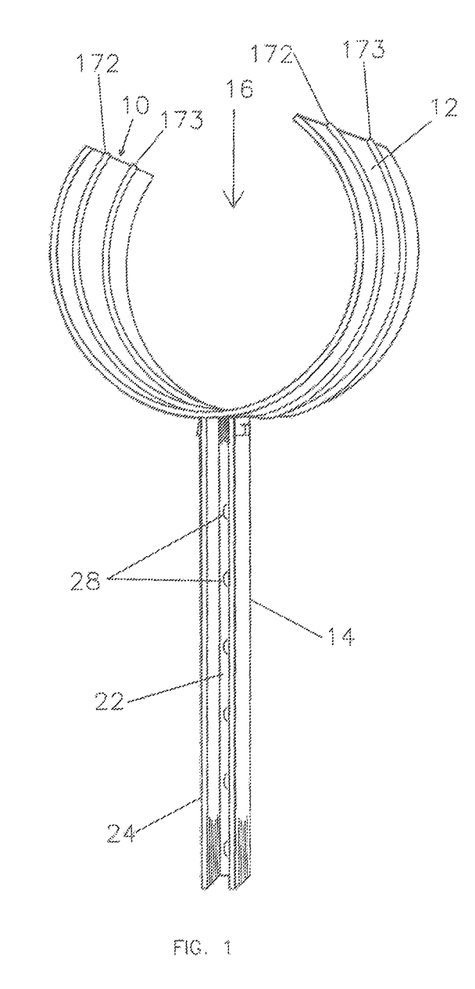
FIG. 1 is a perspective view of an air duct support in accordance with a first embodiment of present invention.
Figure 2:
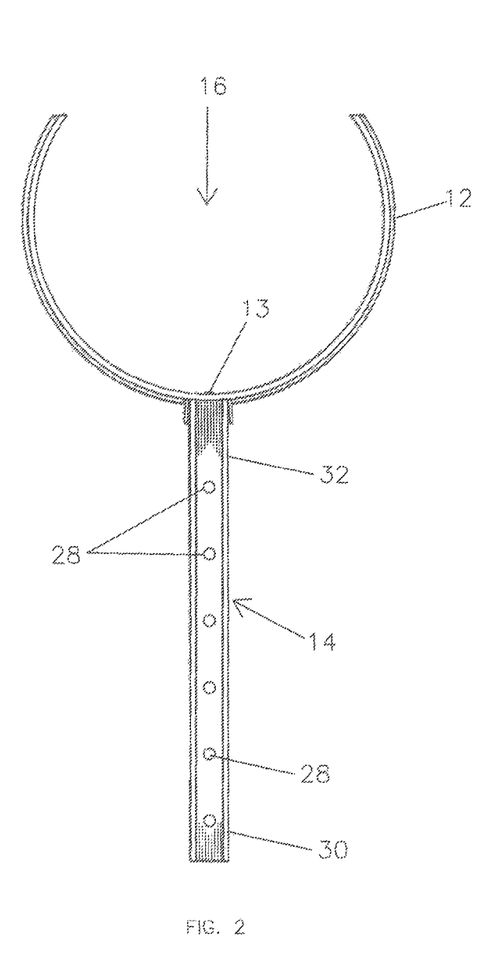
FIG. 2 is a front view of the duct holder of a first embodiment of the present invention.
Figure 3:
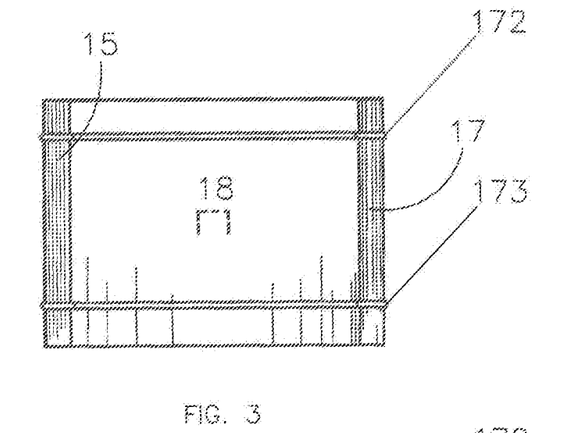
FIG. 3 is a top view of the duct support of a first embodiment of the present invention.
Figure 4:
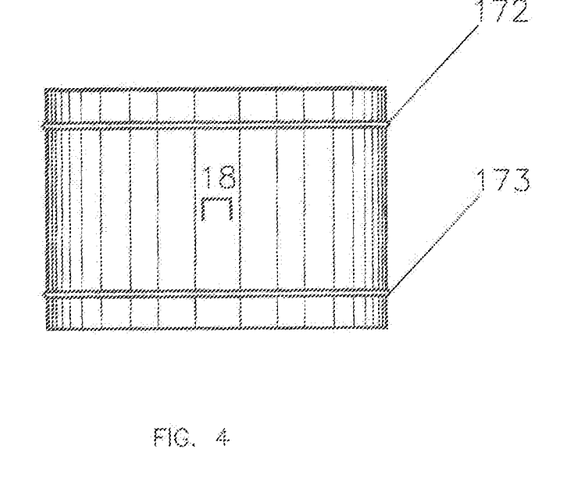
FIG. 4 is the bottom view of the duct holder of a first embodiment of the present invention.
Figure 5:
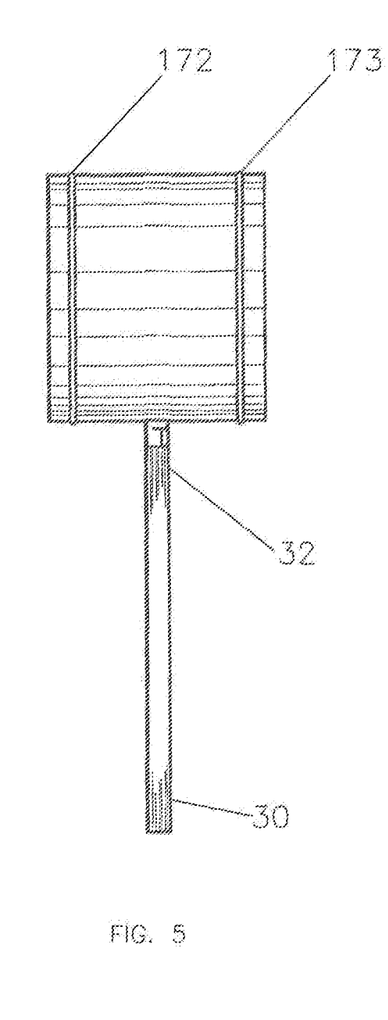
FIG. 5 is side view of the duct holder of a first embodiment of the present invention.

The main body 12 is preferably formed of relatively rigid durable non-corrosive material, such as polypropylene, aluminum and other comparable materials. The size and shape of the channel 16 formed by the main body 12 varies, depending on the exterior configuration of the duct to be supported by the support unit 10.

The support member 14 is formed from a strong non-corrosive material capable of withstanding the weight of a section of the conduit, such as an air duct, resting within the channel 16 of the main body 12. The support member 14 has a generally U-shaped cross-section having a central wall 22 and a pair of parallel side walls 24 and 26, which are the support member 14 is formed from a strong non-corrosive material capable of withstanding the weight of a section of the conduit, such as an air duct, resting within the channel 16 of the main body 12. The support member 14 has a generally U-shaped cross-section having a central wall 22 and a pair of parallel side walls 24 and 26, which are oriented substantially perpendicularly to the central wall 22. A plurality of spaced-apart openings 28 are formed along the length of the central wall 22, extending from the lower portion 30 to the upper portion 32 of the support member 14.

Figure 17A:
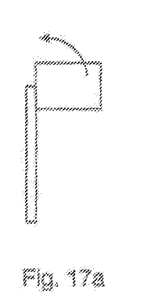
FIGS. 17a through 17c are schematic views illustrating the flexibility of positioning the conduit support via the hinged attachment bridge.
Figure 17B:
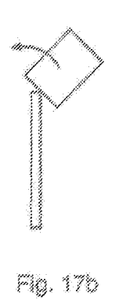
Figure 17C:
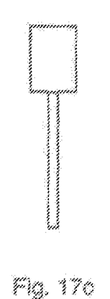
Figure 17D:
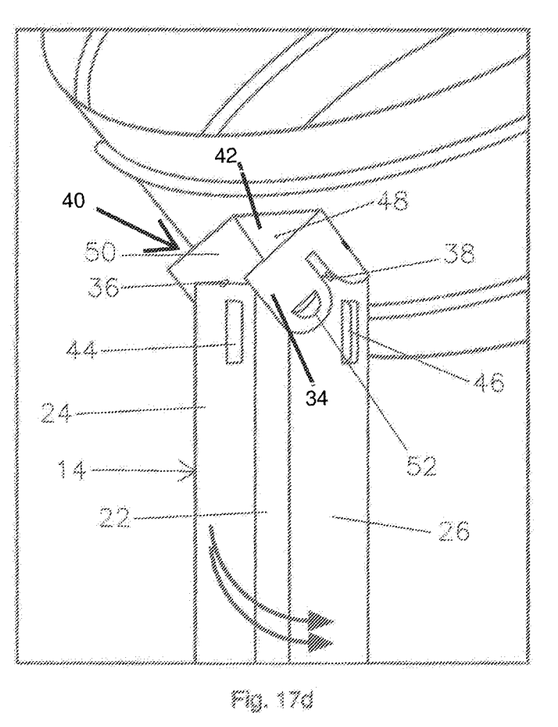
FIG. 17d shows the configuration of an attachment bridge used to hingedly connect the collar plate member to an upright support member.
Figure 17E:
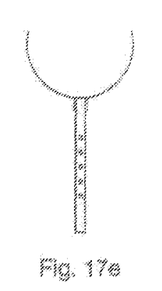
FIG. 17e is a front view of the assembled device shown in FIGS. 17a-17c.
Figure 18:
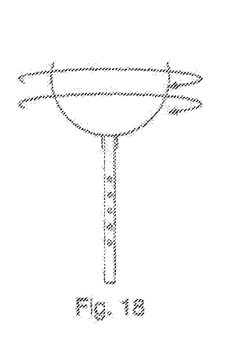
FIG. 18 is a schematic view illustrating free rotation capability of the arcuate support member in relation to the upright support member.
Figure 19:
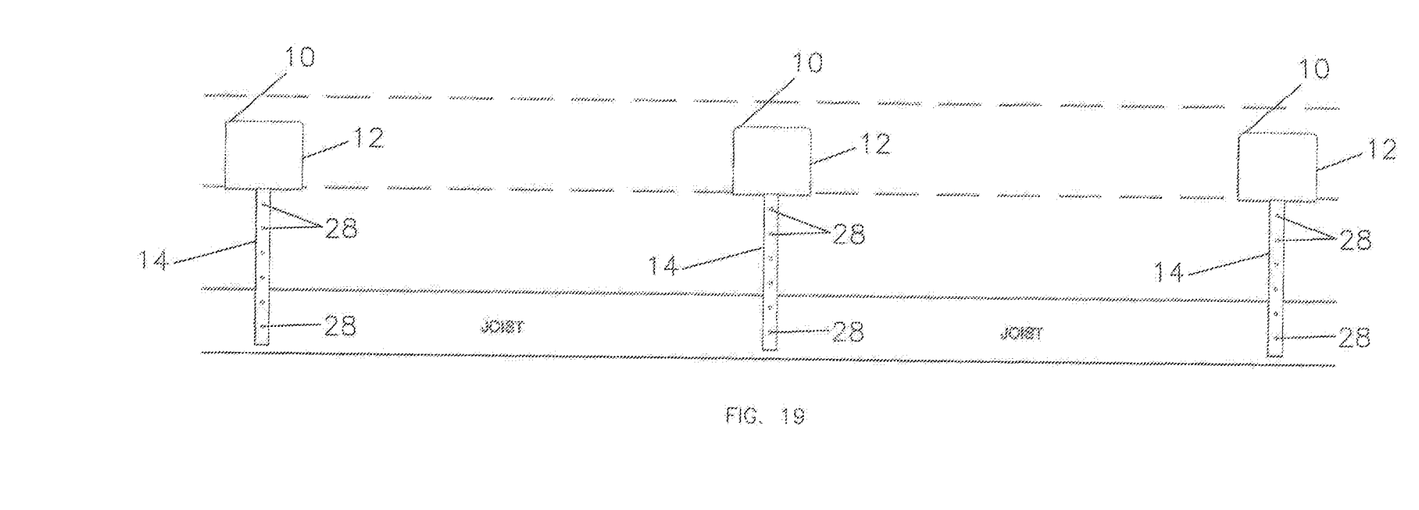
FIG. 19 is a schematic view illustrating a plurality of air duct support units of the present invention secured to a joist.

The support member 14 is formed as a unitary body. A pair of cuts 44, 46 are made through the walls 24, 26, respectively, in the upper portion 32 of support member 14 (FIG. 17d). An attachment bridge 40 is formed by the uppermost part of the support member 14. The attachment bridge 40 comprises a central portion 42, which has the same width as the central wall 22, and a pair of side tabs 34, 36, which have the same widths as the side walls 24, 26, respectively.

When the attachment bridge 40 is prepared for securing to the main body 12, the bridge 40 is bent at 90 degrees in relation to the central wall 22. A central opening 48 made in the attachment bridge 40 receives the rivet 13, allowing the main body 12 to freely rotate in relation to the upright support 14. An opening 50 is formed in a side tab 36, and a similar opening 52 is formed in the side tab 34.

When preparing the support 10 for installation, first moves the main body 12 to orient the main body 12 above the support 14. The main body 12 may be pivotally or hingedly attached to the support member 14, as shown in FIGS. 17a-17e. The user then bends down the bridge 40 so that the side tabs 34 and/or 36 are at 90 degrees relative to the central portion 42, so that the side tabs 34, 36 extend in a substantially parallel relationship to the side walls 24, 26, respectively. The rivet 13 is inserted through the opening made in the main body 12 and through the opening 48.

An opening 44 is made in the wall 24 and a similar opening 46 is made in the wall 26. A user aligns the opening 50 with the opening 44 in the wall 24, and/or aligns the opening 52 with the opening 46 in the wall 26. A user then inserts a snap retaining device in place (not shown). Both sides interlock with 44 with 50, and 46 with 52.

The second embodiment of the air duct support device of the present invention is shown in FIGS. 6-10. The second embodiment is generally designated by numeral 150. The air duct support device 150 comprises a main body 152 and a support member 154. The main body 152, similar to the first embodiment, comprises an arcuate body defining an open channel 156 having an opening between opposing ends 153, 155.

Figure 6:
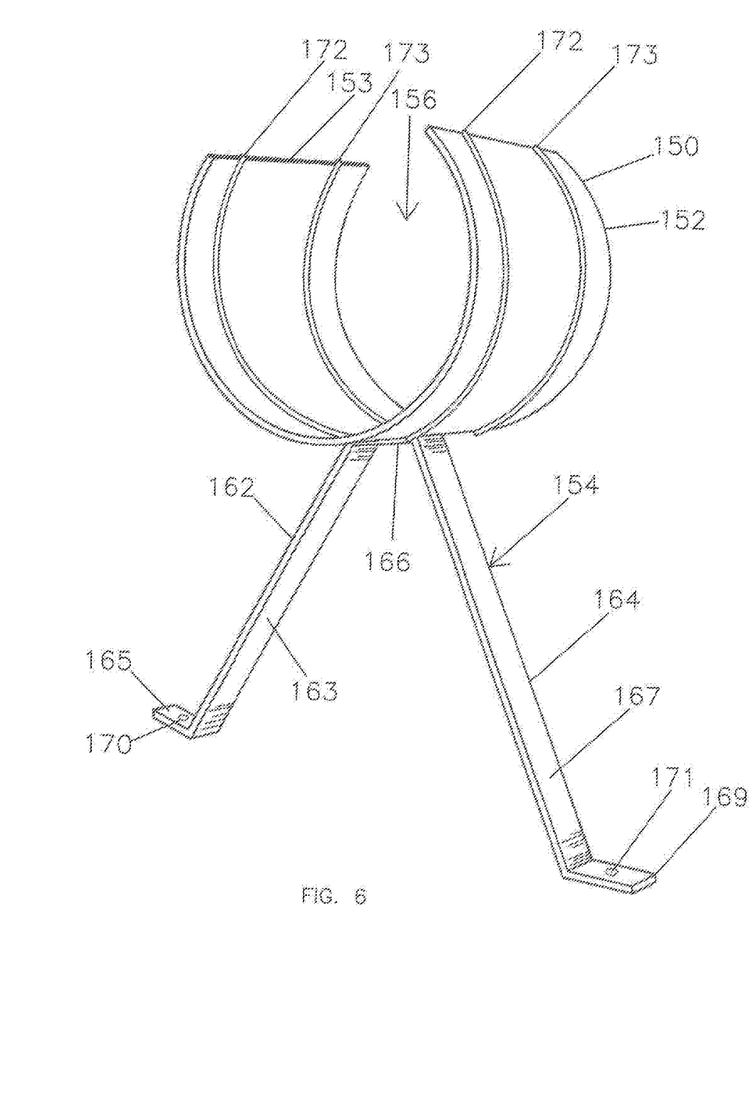
FIG. 6 is a perspective view of an air duct support in accordance with a second embodiment of present invention.
Figure 7:
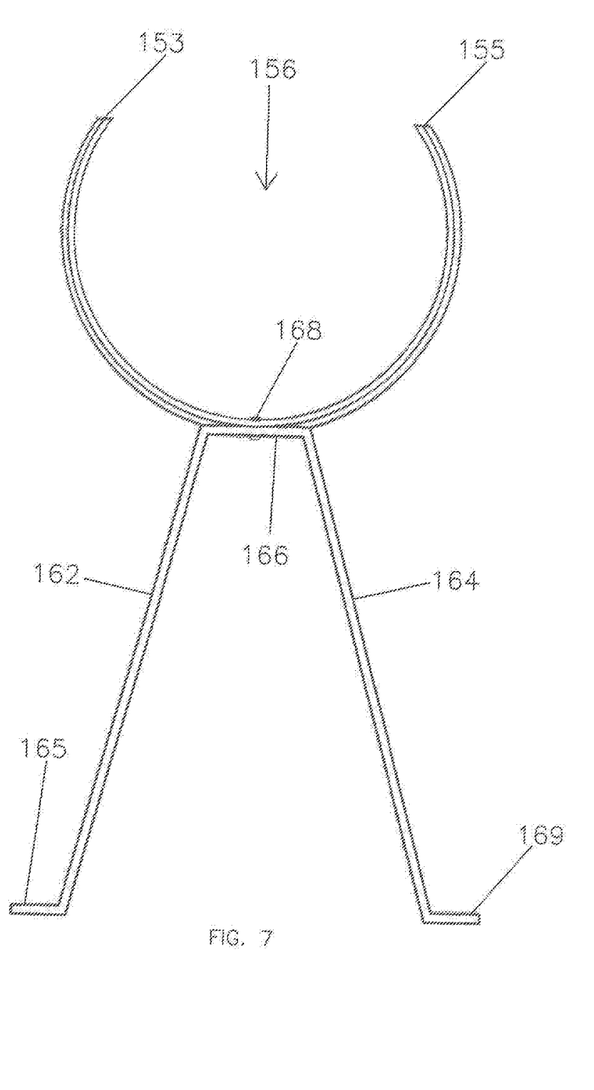
FIG. 7 is a front view of the duct holder of a second embodiment of the present invention.
Figure 8:
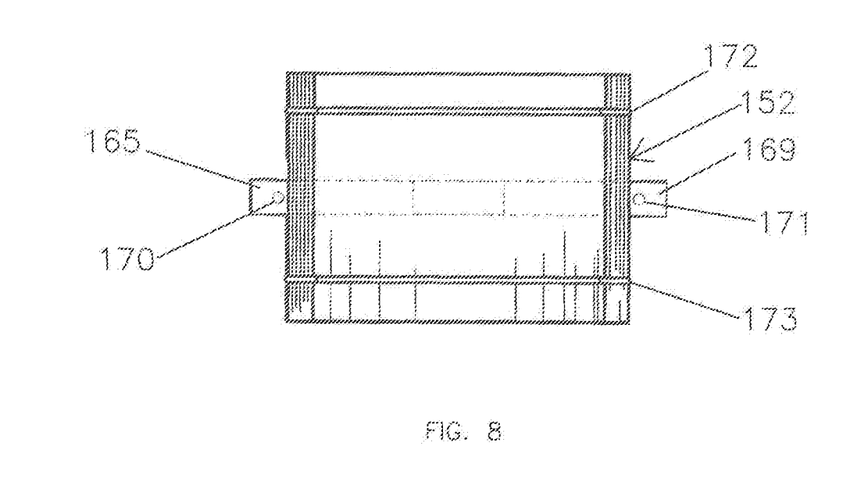
FIG. 8 is a top view of the duct support of a second embodiment of the present invention.
Figure 9:
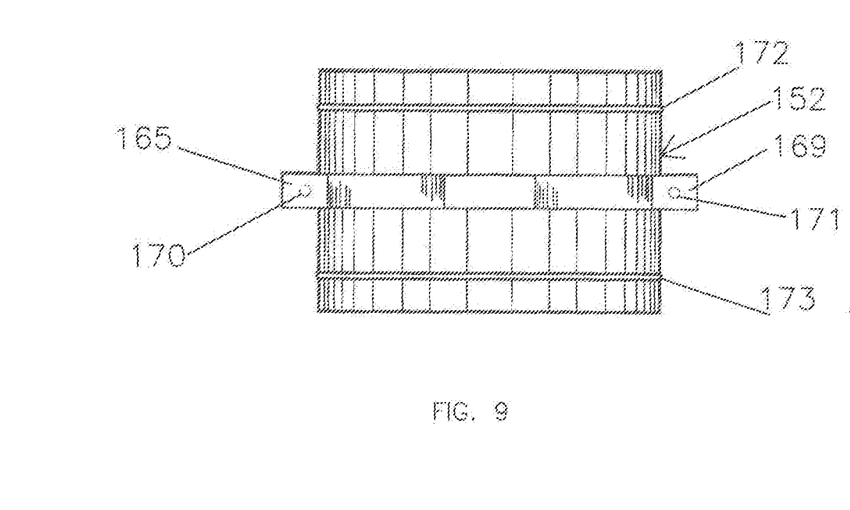
FIG. 9 is the bottom view of the duct holder of a second embodiment of the present invention.
Figure 10:
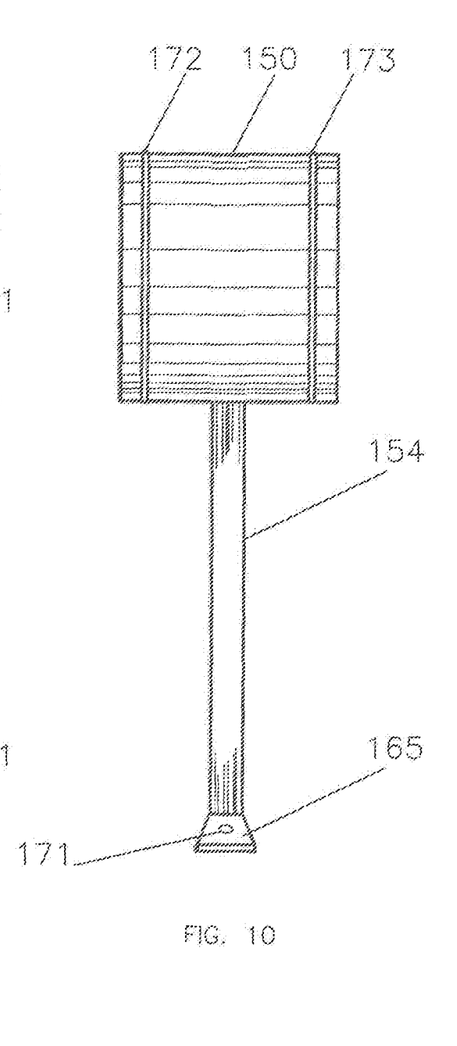
FIG. 10 is side view of the duct holder of a second embodiment of the present invention.

The support member 154, in this embodiment, comprises a pair of spread-apart legs 162, 164, which are oriented at an angle in relation to a central axis of the main body 152. The legs 162, 164 are connected by a bridge plate 166, which is secured to the main body 152 by a rivet 168. The rivet 168 allows free rotation of the main body 152 in relation to the support legs 162, 164, similar to the rotation of the main body 12 in relation to the upright support member 14. In both embodiments, the main body 12, 152 can be oriented to any desired position in relation to the support members to accommodate extension of the conduit, air duct.

The leg 162 comprises an elongated support plate 163 and a unitary formed attachment plate 165 extending at an obtuse angle in relation to the longitudinal axis of the support plate 163. The leg 164 comprises an elongated support plate 167 and a unitary attachment plate 169 secured at an obtuse angle to a longitudinal axis of the support plate 167. An opening 170 is formed in the attachment plate 165, and an opening 171 is formed in the attachment plate 169. The openings 170, 171 are adapted for receiving an attachment means therethrough, such as a screw, bolt, nail and the like, for securing the device 150 to a rafter or a joist.

Construction regulations require that flexible or hard metal ducts be supported at defined intervals along their length and that sagging of the ducts between the supports not exceed more than 2½ inches. The present invention allows support of the air duct from the bottom without constricting the air flow, as is often the case with nylon straps, by allowing the flexible ducts or hard metal ducts to rest within the main body 12 or 152. As a result, the loss of airflow is minimized and greater efficiency of HVAC systems may be achieved. Additionally, the collection of moisture under the ducts is eliminated since the ducts are supported in an elevated position above the floor or insulation.

The main body 12 or 152 is rotatably attached to the respective support members 14, 154 by a rivet 13, 168, respectively, allowing the channel 16, 156 to be oriented in any desired direction where the air duct needs to be directed. The 360-degree rotation of the main body 12, 152 in relation to the support member 14, 154 allows the main body 12, 152 to be oriented in an infinite number of angles in relation to the central axis of the support member 14, 154. As a result, considerable flexibility in positioning of the support device 10, 150 on any available structural member is achieved.

Additionally, in the embodiments disclosed herein, support members 150 and 12 include strengthening beads 172, 173, which run the length of said members.

Figure 11:
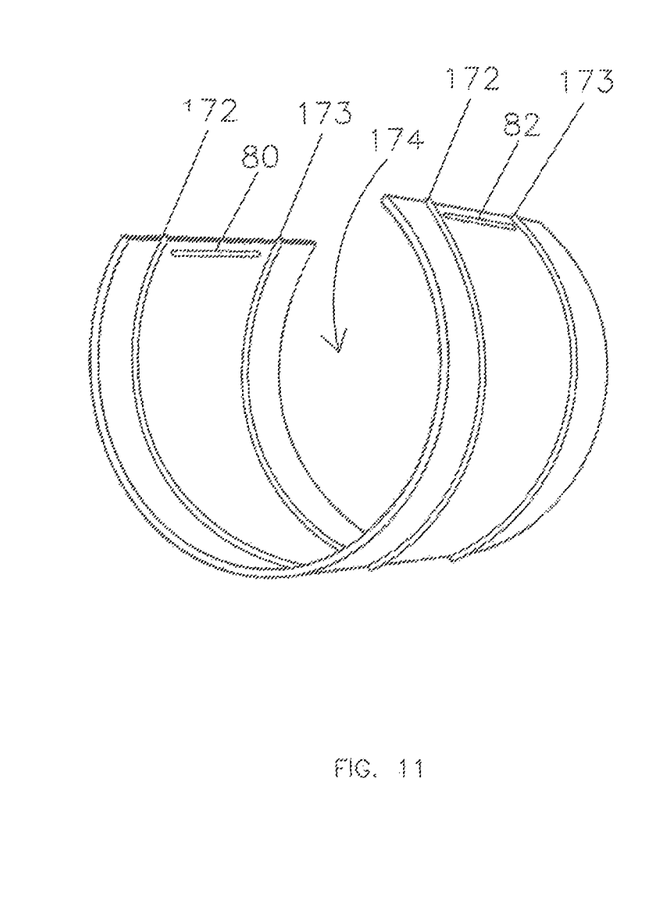
FIG. 11 is a perspective view of an optional upright support extension member for use with the air duct support of the first embodiment of the present invention.
Figure 12:
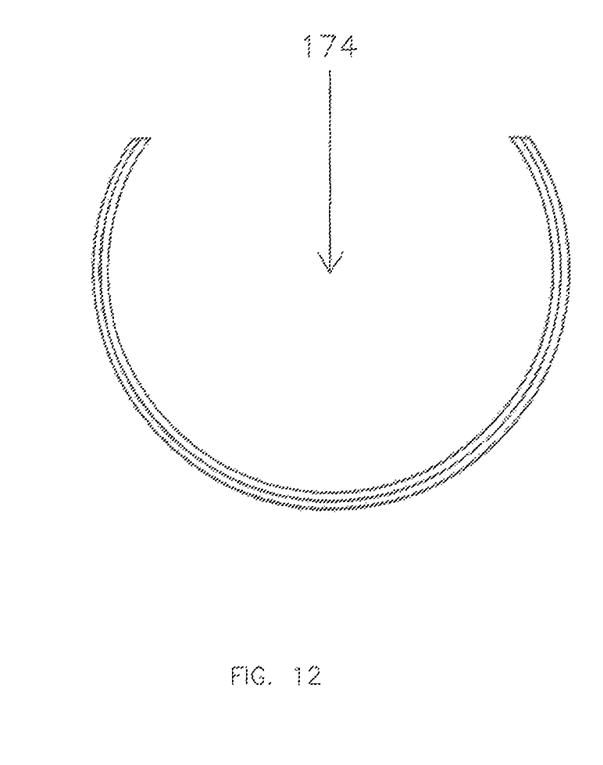
FIG. 12 is a front view of the optional upright support extension member of FIG. 11.
Figure 13:
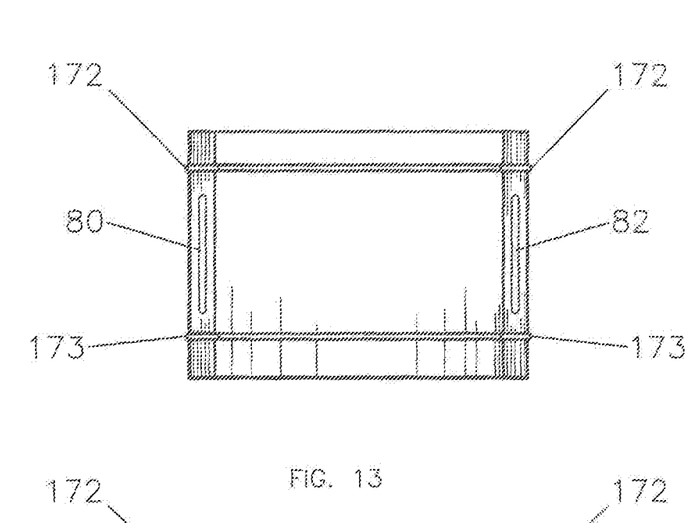
FIG. 13 is a top view of a collar plate member for use when using a rafter installation method.
Figure 14:
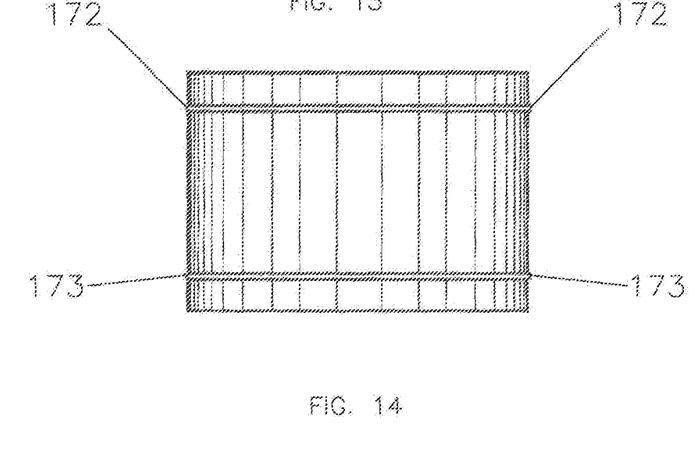
FIG. 14 is a side view of the collar plate member of FIG. 13.
Figure 15:
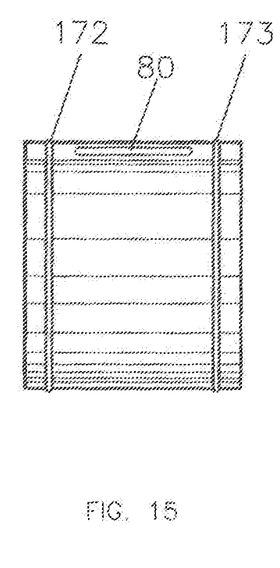
FIG. 15 is an end view of the collar plate member of FIGS. 13 and 14.
Figure 20:
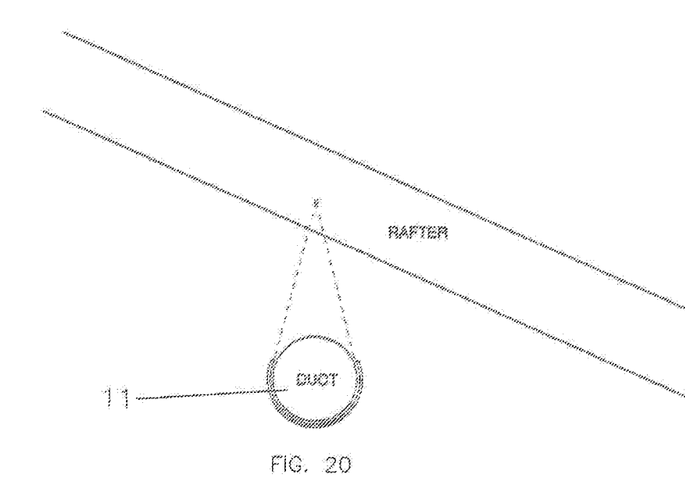
FIG. 20 is a schematic view illustrating an air duct support unit of the present invention secured to a rafter via a strap.

FIG. 11 also shows strengthening beads 172, 173 on an alternative embodiment. FIG. 11 shows slots 80 and 82, which may be used with straps, not shown, to be funneled through to be attached to a rafter as per FIG. 20.

The projecting ends 15, 17 of the main body 12, and ends 153, 155 of the main body 152, extend at a sufficient distance from the bottom of the channels 16, 156, and from each other, so as not to constrict the airflow through the air duct 11 supported by the support device 10, 150. The device 10, 150 when properly installed can readily support the weight of a section of the air duct, be it a flexible air duct or a hard metal conduit.

It will be understood that the particular shapes of the main body 12, 152 and the support member 14, 154 are exemplary and can be easily modified depending on the requirements of the job. For instance, the main body 12 may be formed as a three-sided body forming a rectangular channel for accommodating an air duct or other conduit. The support member 14 may have an I-shaped cross-section; it may be a solid rectangle, cylinder and the like.

What is claimed is:

1. A support device for an air duct conduit, consisting of:
a generally arcuate main body having opposing ends and a bottom defining an opening channel to form a generally U-shaped configuration, said channel being sized and shaped for receiving a portion of the air duct conduit therein, said main body being provided with a pair of strengthening beads extending along an entire curvature of the main body, a slot located between the strengthening beads proximate each of the opposing ends of the main body, and an opening extending through a bottom surface of the main body;

an upright support member secured to the main body, said upright support member being configured to attach to a structural member so as to support the main body and the air duct conduit in an elevated position in relation to a base surface, said upright support member having a central wall and a pair of parallel side walls which form a generally U-shaped cross section, as well as a top portion for supporting the main body and a lower portion being configured to attach to a structural member, and wherein said main body is attached to the top portion of the support member by an attachment bridge so that it can pivot about a horizontal axis;

wherein said attachment bridge is hingedly attached to the top portion of the upright support member, and comprises a central portion having an opening, and a pair of side tabs extending 90 degrees from the central portion;

wherein said openings of said attachment bridge and main body receive a rivet which secures said attachment bridge to the bottom surface of said main body, said pair of side tabs each have a generally semicircular aperture which are configured to align with a respective generally rectangular aperture located on each of the parallel side walls of the upright support member when said main body and attachment bridge are pivoted via said hinged attachment to a locking position; and wherein said generally semicircular apertures and said generally rectangular apertures are configured to receive a retaining device when in said locking position.

\* \* \* \* \*